(12) United States Patent
Engelmann et al.

(10) Patent No.: US 9,275,414 B2
(45) Date of Patent: Mar. 1, 2016

(54) MASS DECISION MODE IN A MOBILE APPLICATION

(75) Inventors: Dietmar Engelmann, Sinsheim (DE);
Arndt Koester, Wiesloch (DE);
Anna-Lena Wingert, Leimen (DE);
Martine Clemot, Stutensee (DE)

(73) Assignee: SAP SE, Walldorf (DE)

( * ) Notice: Subject to any disclaimer, the term of this patent is extended or adjusted under 35 U.S.C. 154(b) by 792 days.

(21) Appl. No.: 13/347,930

(22) Filed: Jan. 11, 2012

(65) Prior Publication Data

US 2013/0097559 A1      Apr. 18, 2013

Related U.S. Application Data

(60) Provisional application No. 61/547,225, filed on Oct. 14, 2011.

(51) Int. Cl.
*G06F 3/048* (2013.01)
*G06Q 40/02* (2012.01)
*G06Q 10/10* (2012.01)

(52) U.S. Cl.
CPC .............. *G06Q 40/02* (2013.01); *G06Q 10/107* (2013.01)

(58) Field of Classification Search
USPC ........................................................ 715/810
See application file for complete search history.

(56) References Cited

U.S. PATENT DOCUMENTS 6,181,340 B1 *   1/2001   Alimpich et al. ............. 715/821
2007/0027782 A1   2/2007   Homier et al.
2008/0098328 A1 *   4/2008   Rollin et al. .................. 715/810

OTHER PUBLICATIONS

"The Beginners Guide to Gmail" (hereinafter Gmail) Published Jul. 9, 2010 available at http://www.makeuseof.com/tag/ultimate-guide-to-gmail.*
"European Application Serial No. 12007010.7, Extended European Search Report mailed Apr. 5, 2013", 7 pgs.

* cited by examiner

*Primary Examiner* — Peiyong Weng
(74) *Attorney, Agent, or Firm* — Schwegman Lundberg & Woessner, P.A.

(57) ABSTRACT

Systems and methods of providing a mass decision mode in a mobile application are provided. An object management module receives a plurality of objects to be presented to a user via a mass decision mode graphical user interface (GUI) of a client application residing on a client device. A mass decision module generates the mass decision mode GUI, the mass decision mode GUI including a description of the respective objects of the plurality of objects and a mass decision option. The mass decision option is an option to apply a deviant decision to a first portion of the one or more objects and to apply a default decision to a remainder portion of the one or more objects upon being selected. A deviant decision module assigns, upon receiving a selection of an object of the one or more objects, the deviant decision to the object.

19 Claims, 10 Drawing Sheets

MASS DECISION MODE IN A MOBILE APPLICATION

CROSS-REFERENCE TO RELATED PATENT DOCUMENTS

This patent application claims the benefit of priority, under 35 U.S.C. Section 119(e), to U.S. Provisional Patent Application Ser. No. 61/547,225, entitled "Batch Mode in a Mobile Application," filed on Oct. 14, 2011, which is incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright SAP AG 2011, all rights reserved.

TECHNICAL FIELD

This patent document pertains generally to data communications and more particularly, but not by way of limitation, to providing a mass decision mode in, for example, a mobile application.

BACKGROUND

In mobile applications, a list of objects may be presented to the user in one of two contexts. The first context is an "edit" mode whereby a user, upon selecting an object, is presented additional detail about the object. The second mode is a batch mode whereby a user, upon selecting an object appearing in a list of objects, makes a decision about that object.

In corporate environments, an accounts payable department identifies one or more accounts to be paid. For example, the accounts payable department may receive an invoice from a vendor, receive instructions from an authorized person to make a payment, process payroll payments based on a report from human resources, or the like.

In a business entity, an accounts payable department, along with one or more systems, determines whether to pay the various accounts. This determination may include determining an amount to be paid, determining when the payment is to be made, and determining if approval of the payment is required. Approval of the payment by one or more particular authorized personnel may be required based on, for example, the identity of the payee, an amount of the payment, or some other reason.

DESCRIPTION OF THE DRAWINGS

Some embodiments are illustrated by way of example and not limitation in the figures of the accompanying drawings in which:

FIGS. 7-9 are depictions of actual user interfaces that may be presented to a user according to one embodiment.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details. In particular, it is noted that the locations of various elements of user interfaces are merely examples and are not intended to limit the scope of the present disclosure. Further, it is noted that while the present disclosure discusses the various interfaces in the context of payment approval within a business entity, alternative or additional embodiments will be apparent to one of ordinary skill in the art in other contexts such as reviewing messages, online shopping and e-commerce, location-based marketing, and the like.

In an example embodiment, a mobile application is provided that has a mass decision mode. A mass decision mode allows a user to select a first portion of objects in a list to be affected by a first action and a remainder portion of the objects in the list to be affected by a second action. The first action and the second action are taken in response to a single input from the user. The term "object", as used herein, includes an electronic entry in a list and the description or title of the object. The mass decision mode may present additional details about each object upon request from the user. The action may be an input received from a user indicating an approval or acceptance, a rejection, a deletion, a transfer of the object to another location or user, or some other action. In an example embodiment, each object in the list is affected by the input received from the user.

Figure 1:
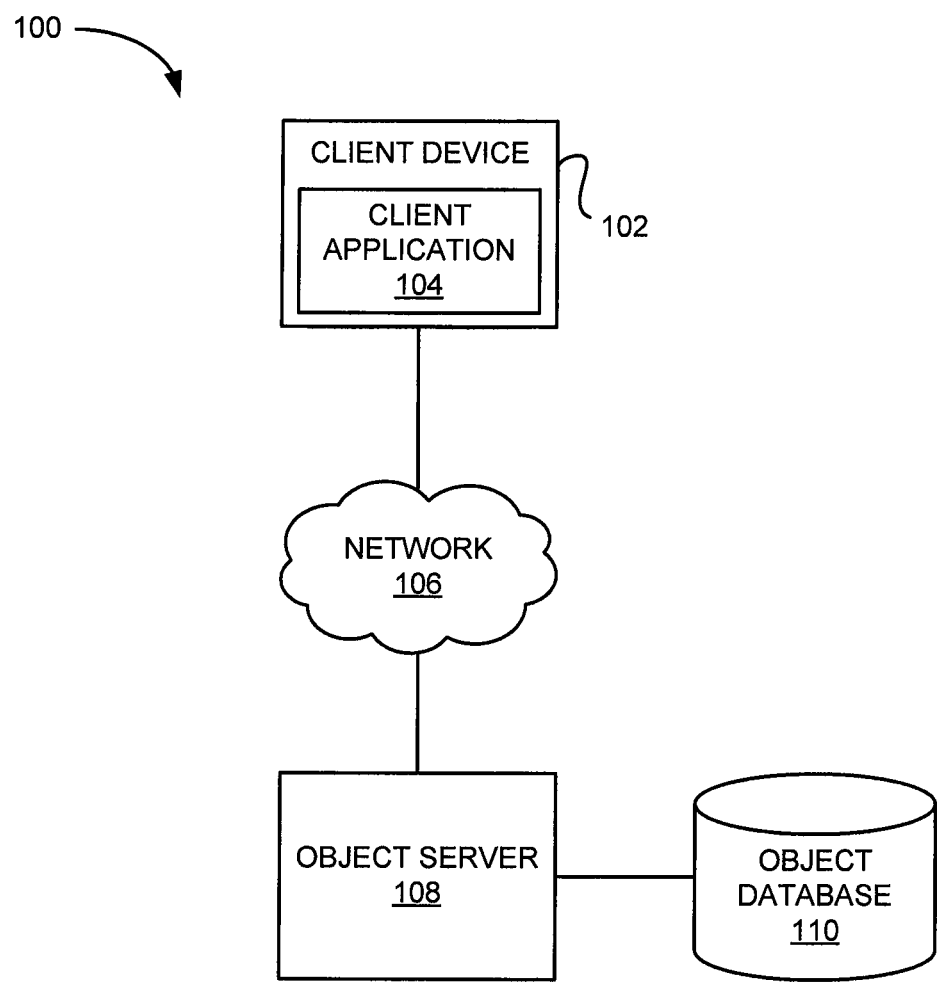
FIG. 1 is a diagrammatic representation illustrating a computing environment in which one or more embodiments may be practiced.

FIG. 1 is a network diagram depicting a client-server system 100, within which one example embodiment may be deployed. A networked system provides server-side functionality, via a network 106 (e.g., the Internet or Wide Area Network (WAN)) to one or more client devices 102. FIG. 1 illustrates, for example, a client application 104 executing on client device 102. Further, while the system 100 shown in FIG. 1 employs a client-server architecture, the present invention is of course not limited to such an architecture, and could equally well find application in a distributed, or peer-to-peer, architecture system, for example. The client application 104 accesses the various services and functions provided by the object server 108 via the programmatic interface provided by, for example, an API server (not shown).

The object server 108 provides one or more services to the client application, including the provision of a mass decision mode to perform various tasks using the client device. The object server 108 may have access to an object database 110. The object database 110 may store records describing objects and decisions made about those objects.

Figure 2:
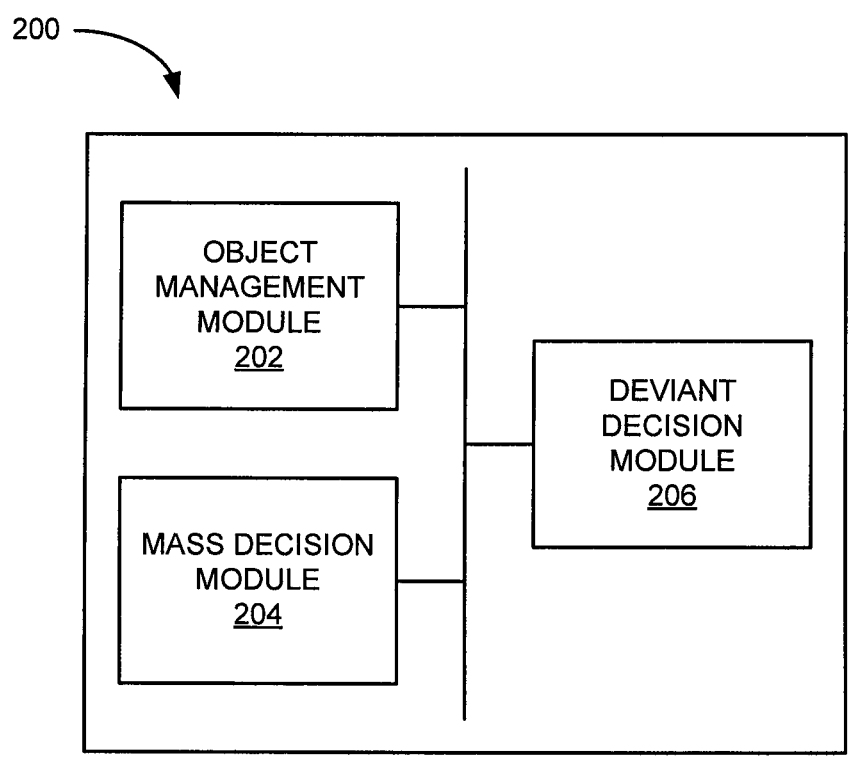
FIG. 2 is a block diagram of an example system for providing a mass decision mode, according to an example embodiment.

FIG. 2 is a block diagram of an example system 200 for providing a mass decision mode, according to an example embodiment. The system 200 may reside wholly or in part at the object server 108 or at the client device 102 as part of executing the client application 104. The system 200 may be implemented as hardware, software, or a combination thereof.

An object management module 202 manages objects presented in a mass decision mode. The objects may be payments awaiting approval, messages addresses to the user, items added to a shopping cart associated with an e-commerce website, other users associated with the user via a social network or correspondence list, events or appointments in a calendar, or the like. The objects may be accessed from the object database 110.

The object management module 202 may further, upon receiving a request from a user, provide additional information about an object to a user. The object about which the information is provided is based on a selection of the object received from the user. The objects may be associated with a decision after being presented in the mass decision mode or in a deviant decision mode.

A mass decision module 204 presents the objects in a mass decision mode interface. The mass decision module 204 further registers default decisions made with respect to at least a portion of the presented objects. The mass decision module 204 accesses the objects to be presented from, for example, the object database 110. The mass decision module 204 generates a user interface that displays the objects and an option for a user to select a default decision. The default decision, when selected, affects every object displayed to the user. Examples of default decisions include, but are not limited to, approve all, accept all, confirm all, mark all as read, address message to all, carbon copy (cc:) or blind copy (bcc:) all, purchase all, or the like.

In some instances, a user may pre-select one or more objects to be affected by a deviant decision. In these instances, the default decision, when activated, affects the remainder of the objects displayed to the user. Upon receipt of the selection of the default decision, the mass decision module 204, in conjunction with the object management module 202, operates to record that each object be affected by the default decision in the object database 110.

A deviant decision module 206 is configured to present a selected object in a deviant decision mode interface. The deviant decision mode interface allows a user to designate an object as being affected by the deviant decision rather than the default decision. The deviant decision mode interface is accessed upon selection of an object displayed in the mass decision mode interface, triggering a display of additional information about the object to the user. The deviant decision mode interface includes an option for the user to designate the object as being affected by the deviant decision. Examples of deviant decisions include, but are not limited to, remove, reject, revoke, mark as unread, remove recipient, do not purchase, or the like.

While default decisions are described as being positive actions and deviant decisions are described as being negative actions, it is understood that a default decision may be a negative action and a deviant decision may be a positive action. Further, in some instances, one or more deviant decisions may be available to a user. For example, further deviant decisions may operate to put a decision on hold or to save an object for later review.

In some embodiments, the deviant decision module 206 may further provide an option, displayed in the mass decision mode interface, to a user to designate an object as being affected by the deviant decision. The option operates to designate the object, as it appears in the mass decision mode interface, as being affected by the deviant decision instead of the default decision.

Figure 3:
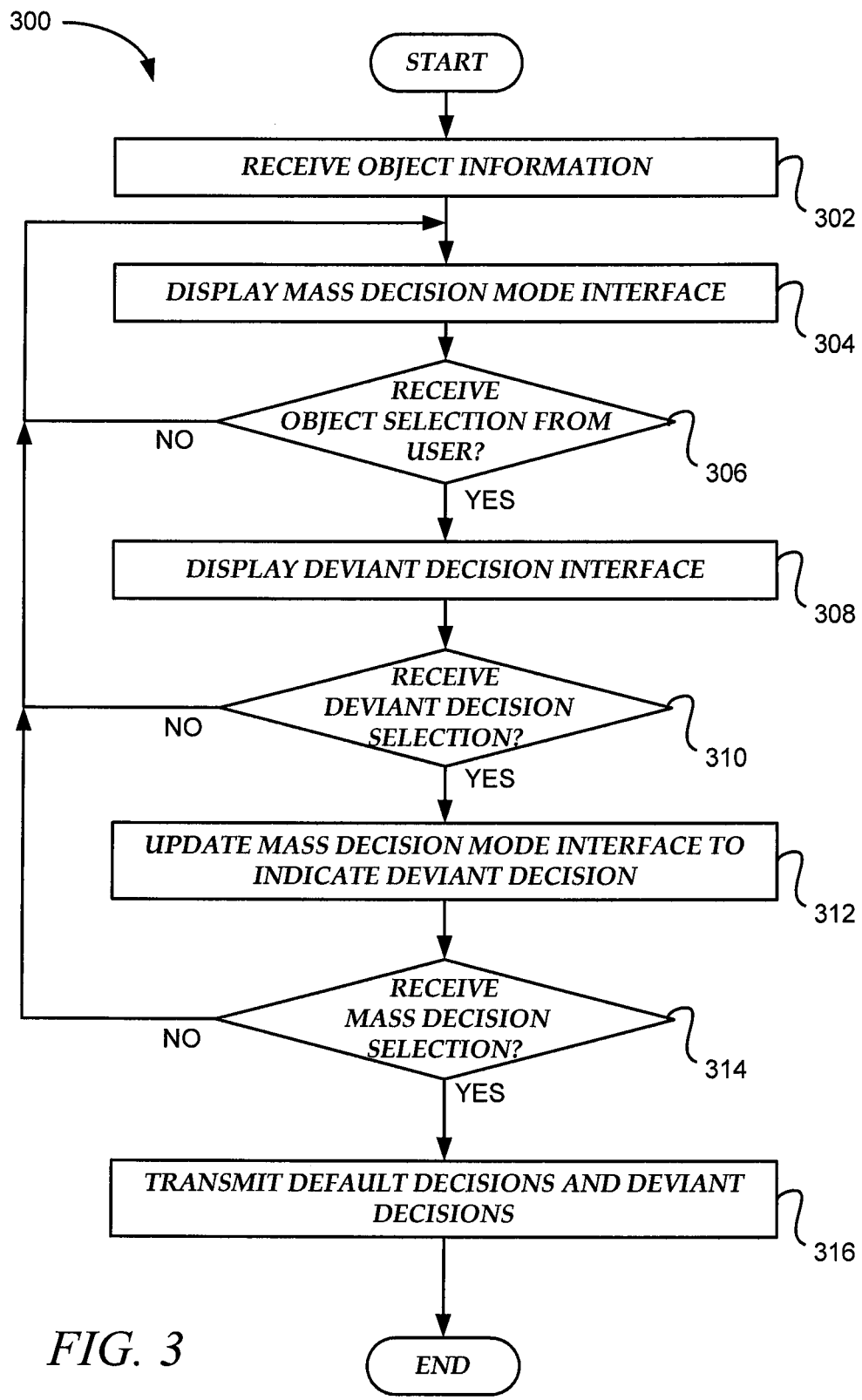
FIG. 3 is a flow chart illustrating a method of operating a mass decision mode, according to an example embodiment.

FIG. 3 is a flow chart illustrating a method 300 of operating a mass decision mode, according to an example embodiment. The method 300 may be performed by the system 200, the object server 108, or the client application 104 residing at client device 102.

In an operation 302, object information is received from the object database 110 via, for example, the object server 108. The object information includes information about each object to be displayed to the user in a mass decision mode interface.

In an operation 304, the mass decision mode interface is displayed to the user at the client device 102. The mass decision mode interface includes a display of a plurality of objects about which a decision is to be made and an option to select a default decision that applies to each object (except for objects associated with a deviant decision) is displayed. The mass decision mode interface may display the plurality of objects as a list or in another arrangement.

In an operation 306, a determination is made as to whether a selection of an object has been received from the user. If no selection has been received, the method 300 returns to operation 304 by continuing to display the mass decision mode interface.

In an operation 308, in response to receiving a selection of an object, a deviant decision interface is displayed to the user. The deviant decision interface may include additional information about the object retrieved from the object database 110. The deviant decision interface includes an option to apply a deviant decision to the object about which additional information is displayed in the deviant decision interface.

In an operation 310, a determination is made as to whether a deviant decision selection has been made. A deviant decision selection may be made by selecting a deviant decision from the deviant decision interface. No deviant decision may be made by selecting a cancel or back option or by allowing the deviant decision interface to time-out by not making a selection within a pre-defined amount of time. If no selection is received, the method returns to operation 304.

In some instances, operation 310 may be performed immediately after operation 304 where the mass decision mode interface allows a user to select a deviant decision from the mass decision mode interface.

In an operation 312, in response to receiving the deviant decision, the mass decision mode interface is updated to indicate that the deviant decision is received. The indication may be an icon positioned adjacent to the object in the mass decision mode interface.

In an operation 314, a determination is made as to whether a mass decision selection has been received. The operation 314 may be performed, in some instances, immediately after operation 304 where the user makes no selections of objects or does not provide a deviant decision selection. The mass decision selection affects each and every object presented in the mass decision mode interface. The mass decision selection assigns a deviant decision to a first portion of the objects and assigns a default decision to the remainder of the objects. In instances where the user has not selected any objects as being assigned a deviant decision, every object is assigned the default decision when the mass decision selection is received. If no mass decision selection is received, the method 300 returns to operation 304.

In an operation 316, the default decisions and deviant decisions are transmitted to, for example, the object server 108 and recorded in the object database 110.

Figure 4:
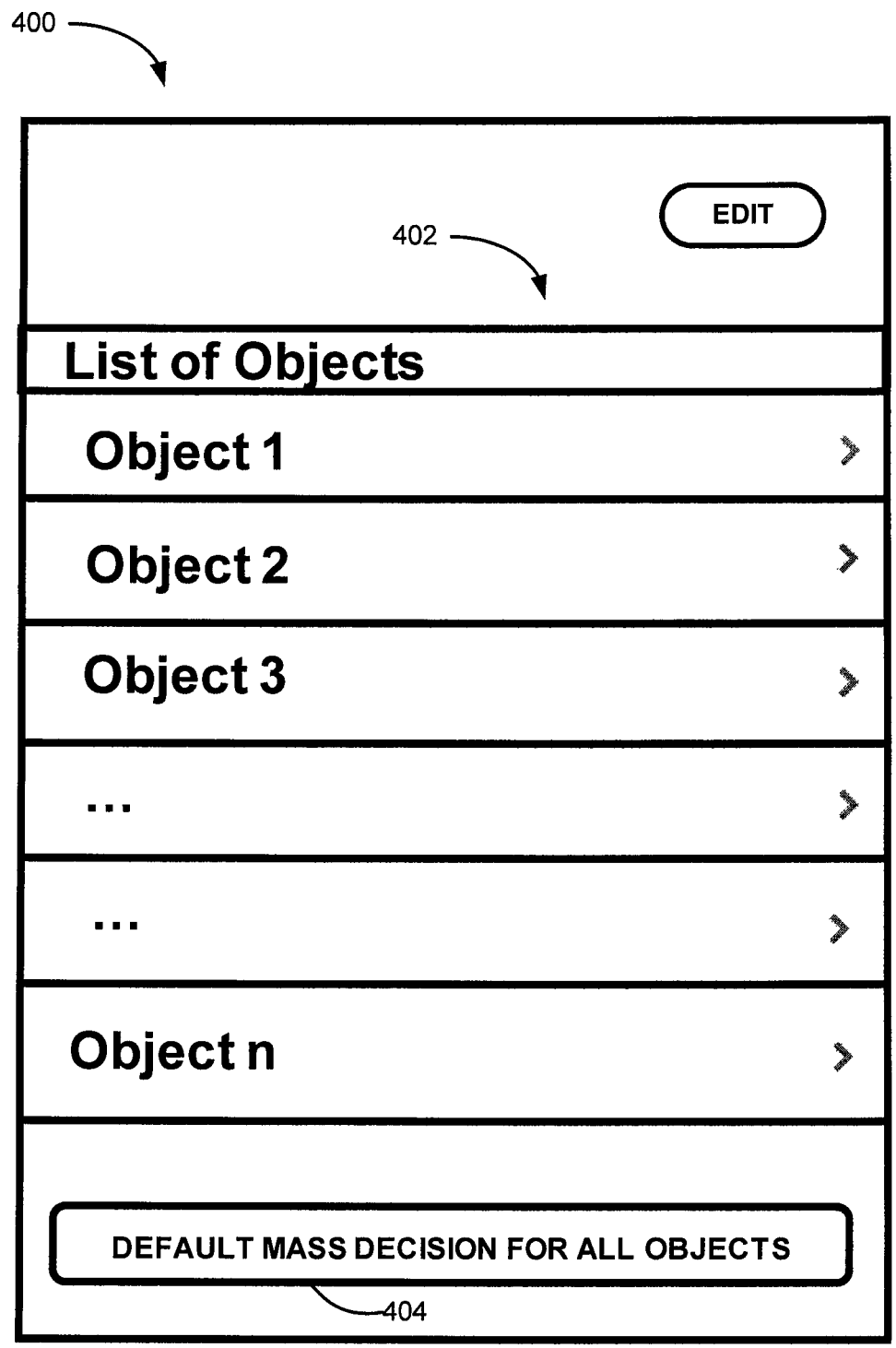
FIG. 4 is an example user interface initially provided in a mass decision mode.
Figure 5:
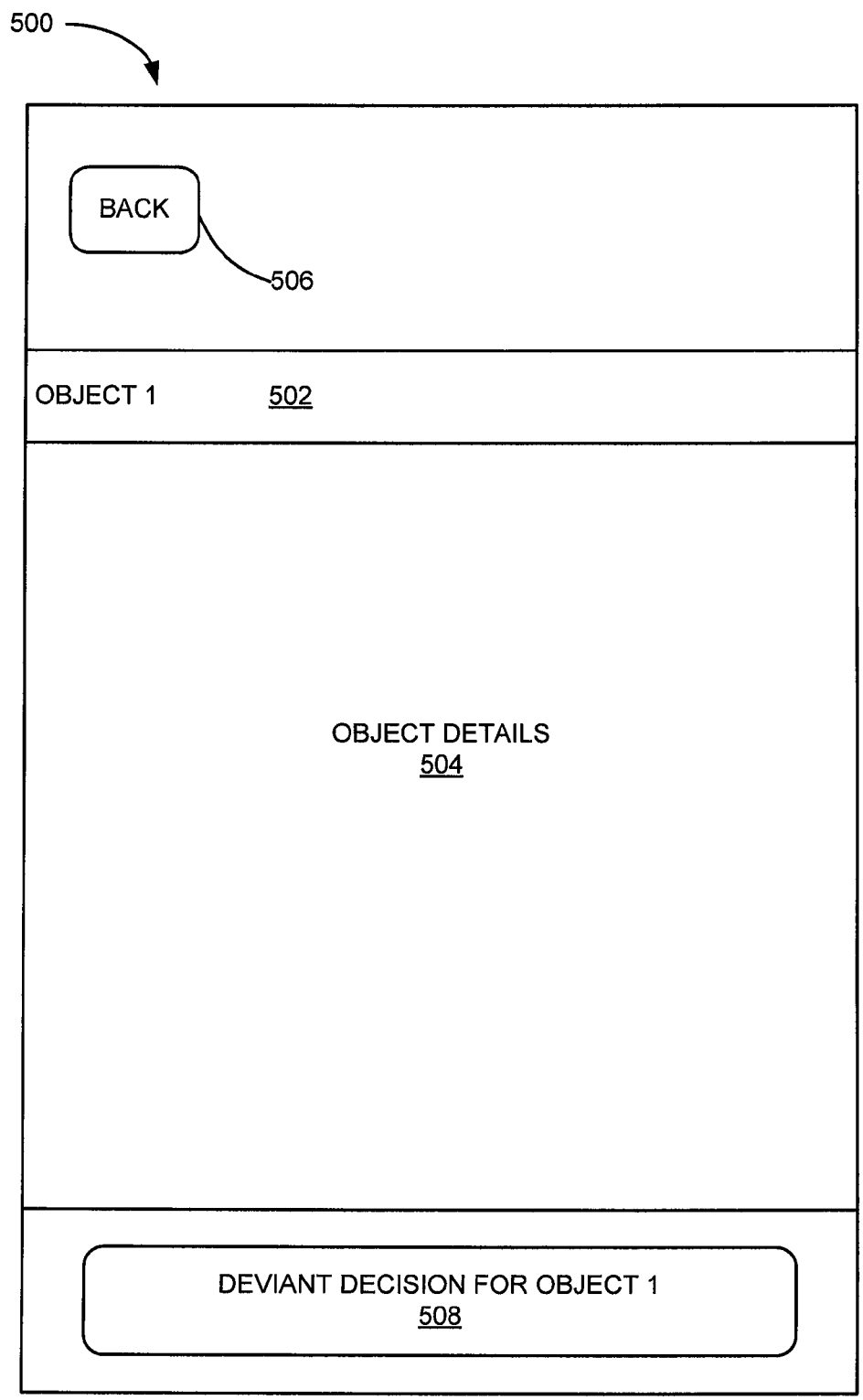
FIG. 5 is an example user interface to present additional details about an object in a deviant decision mode.
Figure 6:
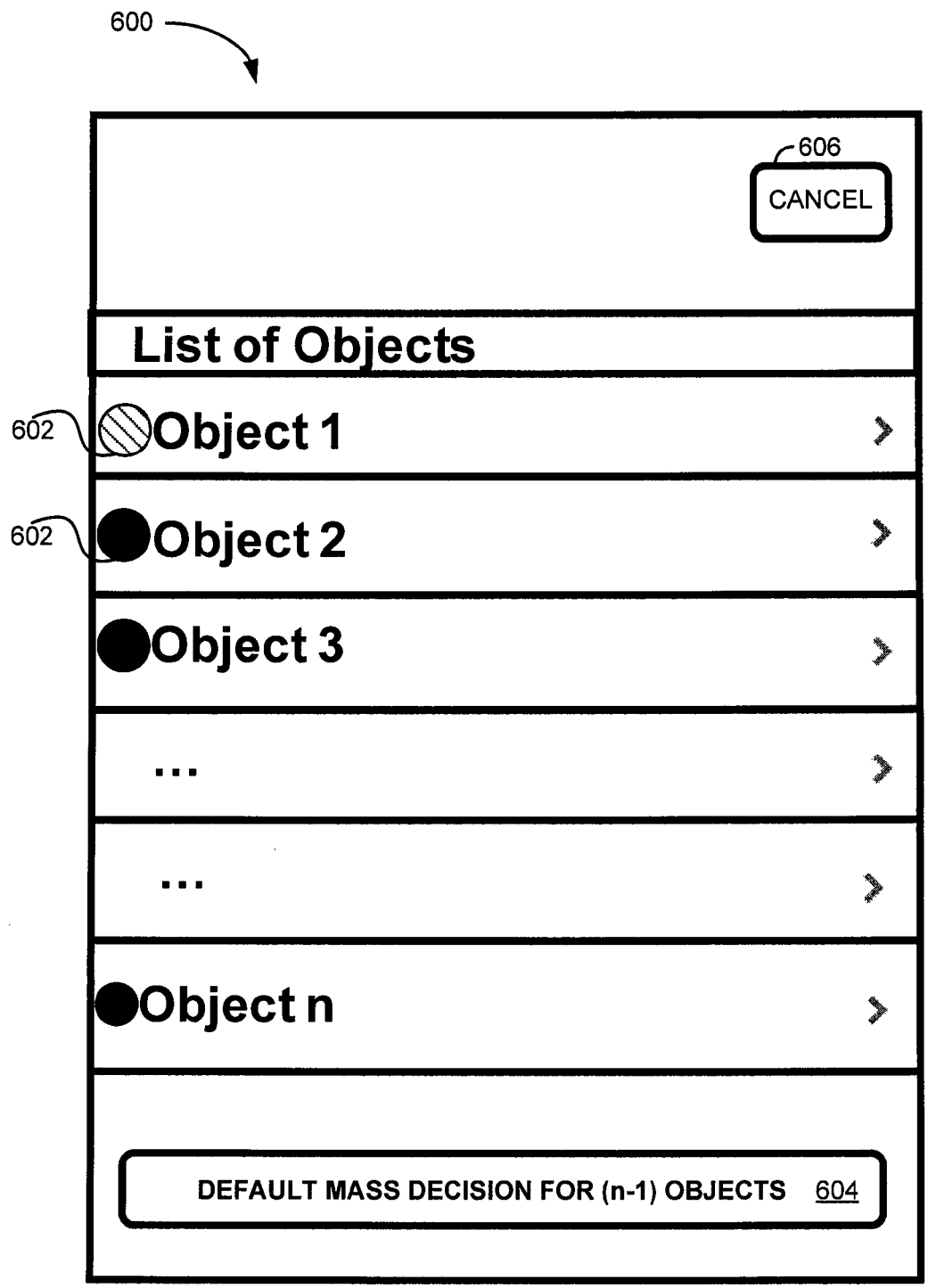
FIG. 6 is an example user interface showing mass decisions and deviant decisions.

FIGS. 4-6 depict example user interfaces that may be used in instances where a mass decision mode is provided in a mobile application for approving payments. Specifically, for instances in a business entity where one or more particular authorized personnel are required to approve a payment before funds are released. The one or more particular authorized personnel may be personnel who are separate from the accounts payable department or who are in charge of the accounts payable department. The identification of the authorized personnel is performed by the business entity itself but is typically someone outside of the accounts payable department. Depending on the structure of the business entity using the provided mobile application, the particular authorized personnel may be cash managers, finance executives, owners, board members, a president or vice-presidents, C-level personnel, and the like.

The requirement that a payment be approved is determined by the business entity according to one or more rules. Typically, most payments made by a business entity do not require approval by authorized personnel. Instead, these payments are released based on an authorization issued by a member of an accounts payable department. The rules may indicate that certain payments above a particular amount be approved or that payments to particular entities be approved before being released. The rules may indicate that a minimum number of approvals be received. For example, for very large payments (e.g., over $1,000,000), approvals from two or more authorized personnel are required before the payment is released.

The authorized personnel are typically high-level personnel within the organization for whom the approval of the payments is a time-consuming formality. As such, a payment application is provided to allow the approval of the payments by the user (i.e., an authorized personnel) using a mobile device or other computing device. The payment application is installed on the mobile device and accessible by the user.

The payment application, executed by the mobile device, receives a list of pending payments awaiting approval via a network from a device associated with the accounts payable department of the business entity. The payment application may display this list indicating, for example, an identity of the payee, a payment number used by the accounts payable department, an amount and currency of the payment, and a number of invoices corresponding to the payment.

FIG. 4 is an example user interface 400 initially provided in a mass decision mode. The user interface 400 includes a list 402 of objects that correspond to payments awaiting approval. In other embodiments, the user interface of FIG. 4 may be adapted to other contexts to list, for example, messages received by the user, items in a user's electronic shopping cart, geographic locations near the user, discounts offered to the user, or content items accessible by the user (e.g., blog entries, articles, podcasts, songs, books, or videos) and the like. At this point, in the context of accounts payable, the accounts payable department has already processed the payment according to processes within the business entity to determine the specifics of the pending payment such as the amount to be paid, when the payment will be made, the currency in which to make the payment, the account used to make the payment, the identity of the payee, the invoices received from the payee corresponding to the payment, and the like.

The payment application may further display information about the payer, such as the identity of the payer, the financial institution and account from which the funds are to be released, the balance in the account, a total amount of the payments to be made, and the status of the displayed payments—for example, new (first pending approval), approved, or rejected. The user interface of FIG. 4 may show this information in a top portion, above the list 402 of objects.

As depicted at the bottom of the user interface shown in FIG. 4, one or more buttons for batch processing of the payments pending approval are provided. As shown in FIG. 4, one default decision button 404 may be provided (e.g., "approve all"). In some instances, additional mass decision buttons may be provided (e.g., "reject all"). The additional mass decision buttons affect all objects presented in the list 402.

As shown in FIG. 4, to the right side of each entry, an arrowhead is displayed. When selected, a deviant decision interface is provided where the user may be presented a deviant decision interface that includes additional information about the object. The user is further provided an "Edit" button that, when selected, directly switches the payment application to the mass decision mode described in FIG. 6. FIG. 5 is an example deviant decision interface 500 to present additional details about an object in a deviant decision mode. The example deviant decision interface 500 includes an object title 502 and displays additional information about the object in the object details portion 504.

The particular details displayed by in the object details portion 504 of a payment application may be dictated by the context or the business entity and may vary from user to user. In the accounts payable context, the details may include information about the invoices corresponding to the payment. Moreover, a user may be provided a second arrowhead in connection with a certain detail that, when selected, provides even further detail about the selected detail. The further deviant decision mode interface may include a button to select a deviant decision.

In some instances, a top portion of the deviant decision interface 500 may be updated to indicate the pending payment selected by the user. For example, in a payment application, the top portion may indicate the payee, the financial institution associated with the payment (payer or payee), an account associated with the payment (payer or payee), a total amount of the pending payment, and the status of the pending payment.

Referring to a bottom portion of the deviant decision interface shown in FIG. 5, a button 508 is provided to the user that, when activated, causes a deviant decision instead of the default decision to be selected. In the payment application example, if the default decision is to approve the payment, the deviant decision is to reject the payment. The button therefore indicates that, if activated by the user, the payment will be rejected. To exit the screen without activating the deviant decision, a "back" button 506 is provided that returns the user to the interface of FIG. 4 where no change in status is indicated.

If a deviant decision is selected by the user, the user is automatically navigated to the mass decision mode interface 600 of FIG. 6 where the change in status is displayed to the user.

FIG. 6 is an example user interface showing mass decisions and deviant decisions. More specifically, FIG. 6 depicts a mass decision mode interface 600 as it would appear if the button to activate the deviant decision is selected. The user interface of FIG. 6 resembles the interface of FIG. 4 in that the entries (e.g., pending payments) are listed and displayed to the user. Further, each entry is accompanied by an icon 602 indicating a provisional status of the entry (e.g., accepted or rejected). The status icons made available by the application may depend on the context in which the application is used. In the accounts payable context, the provisional status may be "accept" or "reject". In other contexts, the provisional status may be a binary status or one of any number of available statuses associated with the context. In some examples, a green icon may represent an "accept" status and a red icon may represent a "reject" status. Each entry is further accompanied by an arrowhead selected by the user to view the detail page associated with the entry.

The user interface of FIG. 6 depicts the mobile application in a mass decision mode. In prior art applications, an edit mode only includes the ability to select one or more objects from a list and to perform an operation on the selected objects only. For example, an edit mode in a mobile application for checking email may only include a list of email messages in the user's inbox. A user may "check" the messages to be processed (e.g., deleted, marked as read, etc.) in the edit mode. However, in the edit mode, a user may not open the messages or otherwise review the messages. Further, no operation is performed on the unselected objects when a user executes a function on the selected objects.

Unlike the "edit mode" available in the prior art, in the user interface depicted in FIG. 6, the user has the ability to navigate directly from the edit mode (depicted in FIG. 4) to the detail page (e.g., the deviant decision interface) of the object (depicted in FIG. 5). The user, upon navigating to the detail page of a certain entry, further has the ability to change a status of the certain entry at the detail page. Upon making the change, the user is automatically redirected back to the mass decision mode where the change is reflected by a change in appearance of an icon associated with the certain entry.

In some instances a user, after making one or more deviant decisions or default decisions that are displayed the mass decision mode, navigates to another detail page of another object. The user may then navigate back to the object list in the mass decision mode by selecting a deviant decision or a "back" button 506 on the other detail page corresponding to the other object. When the user returns to the object list in the mass decision mode, the user's previous default or deviant decisions, along with the most recent decision regarding the other object, are preserved and displayed to the user. In this way, the user can view additional detail pages while preserving or maintaining decisions made from earlier-viewed detail pages or made earlier from the object list in the edit mode.

In some instances, the icons 602 within each entry are selectable to toggle between the default decision (e.g., "accept") and the deviant decision (e.g., "reject") to change the provisional status of that entry. In other instances or contexts, the icons 602 may toggle between more than two provisional statuses.

As further depicted in FIG. 6, a button 604 to execute a mass decision is provided at the bottom of the user interface. The mass decision may be to assign a default decision to all objects except for objects where a deviant decision has been activated by the user. In some instances, the number of entries affected by the execution of the default decision may be displayed to the user. Further, upon activation of the button to execute the mass decision, the function of rejecting the objects where the deviant decision has been activated is also performed. Thus, with one press of a button the user both approves the objects for which no deviant decision was indicated and rejects the objects for which the deviant decision was indicated. The user need not first approve the "approved" objects and then formally reject the "rejected" objects.

In some instances, the provisional status icon 602 may be animated to depict the change in status as a smooth transition. The smooth transition may further include modifying the button 604 at the bottom of the user interface to reflect the updated provisional statuses of the entries (e.g., approve (5)-reject (1)).

In some instances, every received object may be displayed on a single, scrollable, user interface where every object is affected when the button at the bottom of the user interface is selected. In other embodiments, the received objects may be divided into sub-batches where only one sub-batch is displayed to the user. In these instances, the button at the bottom of the screen, when executed, may only affect the objects in the sub-batch while not affecting objects associated with a separate sub-batch.

A cancel button 606 allows as user to leave the edit mode and return to the user interface described in FIG. 4.

Figure 7:
Figure 8:
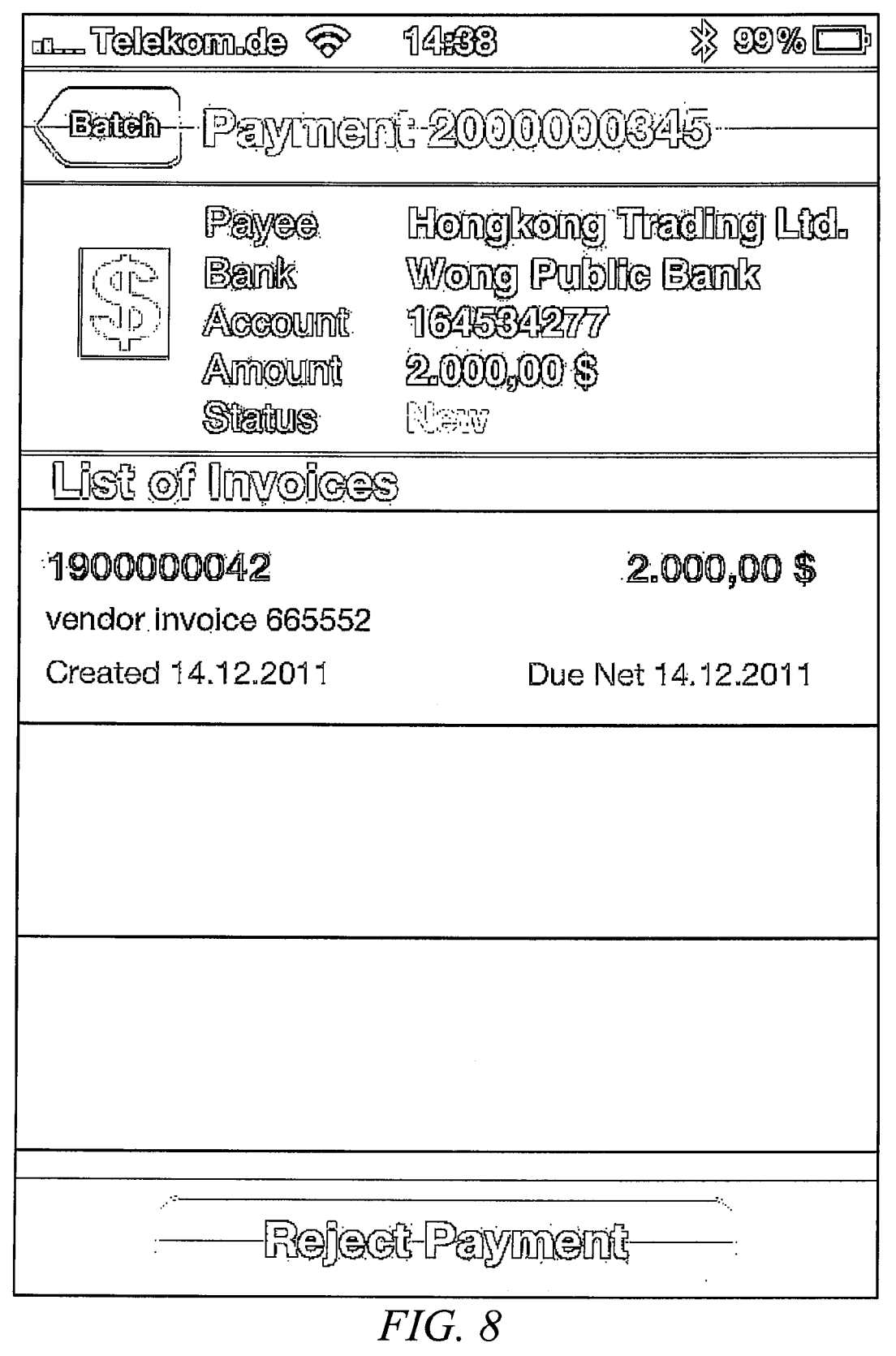

FIGS. 7-9 are depictions of actual user interfaces that may be presented to a user according to one embodiment. The user interfaces of FIGS. 7-9 are presented in a payment approval context.

For example, the interface of FIG. 7 roughly corresponds to the interface of FIG. 4, including a list of objects and a default decision button (e.g., button labeled "Approve"). The interface of FIG. 7 further includes a second button, a deviant decision button (e.g., button labeled "Reject") that would cause the user to apply a deviant decision to each object (e.g., payment) presented.

In a likewise fashion, the interface of FIG. 8 roughly corresponds to the interface of FIG. 5. The interface of FIG. 8 may be accessed upon selection of an object in the interface of FIG. 7 and may provide additional information about the selected object and an option to apply a deviant decision to the selected object (e.g., button labeled "Reject Payment").

Similarly, the interface of FIG. 9 roughly corresponds to the interface of FIG. 6. In this instance, where the user has selected a deviant decision for one object of the displayed objects, the user is provided an option to reject the selected object and to approve the remaining five objects presented by selecting a button labeled "Done".

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
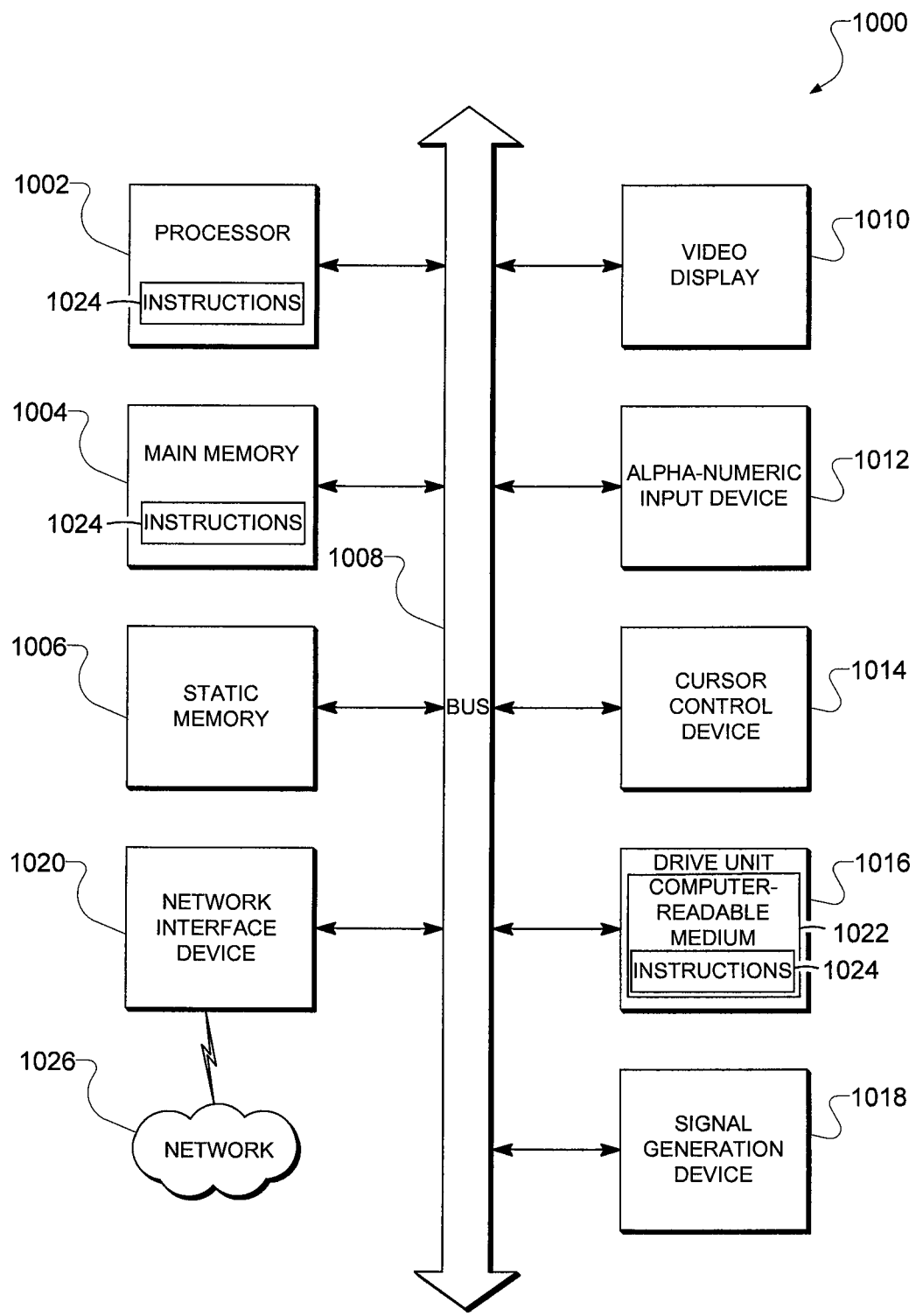
FIG. 10 is a block diagram of machine in the example form of a computer system within which a set instructions, for causing the machine to perform any one or more of the methodologies discussed herein, may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or touch sensitive display screen), a user interface (UI) navigation device 1014 (e.g., a mouse or touch sensitive display screen), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A device comprising:
   one or more processors; and
   a non-transitory machine-readable storage medium having instructions embodied thereon, the instructions executable by one or more processors to perform operations comprising:
     receiving a plurality of objects with an initial status to be presented to a user via a mass decision mode graphical user interface (GUI) of a client application;
     generating the mass decision mode GUI, the mass decision mode GUI including a description of the respective objects of the plurality of objects and a mass decision option, the mass decision option configured to execute a first action on a first portion of the plurality of objects and to execute a second action on a remainder portion of the plurality of objects upon being selected, the first action being distinct from the second action, execution of the second action and the first action causing a change in a status of the plurality of objects, the first action and the second action selected from the group consisting of approve a portion of the objects, accept the portion of the objects, confirm the portion of the objects, mark the portion of the objects as read, address message to the portion of the objects, carbon copy or blind copy the portion of the objects, and purchase the portion of the objects;
     assigning, upon receiving a selection of an object of the first portion of the plurality of objects, the first action to the object, the object comprising the first portion of the plurality of objects; and
     in response to receiving a selection of the mass decision option, performing the first action on the first portion of the plurality of objects and the second action on the remainder portion of the plurality of objects.

2. The device of claim 1, wherein the second action is selected from the group consisting of remove the selected object, reject the selected object, revoke the selected object, mark the selected object as unread, remove the selected object as a recipient, and do not purchase the selected object.

3. The device of claim 1, wherein the deviant decision module is configured to generate a deviant decision GUI upon receiving a selection of an object of the plurality of objects, the deviant decision GUI including a further description of the selected object and an option to assign the first action to the selected object.

4. The device of claim 3, wherein the deviant decision GUI includes an option to return to the mass decision mode GUI without assigning the first action to the selected object.

5. The device of claim 3, wherein the deviant decision GUI includes an option to assign the second action to the selected object.

6. The device of claim 1, wherein the mass decision mode GUI further comprises icons adjacent to the respective objects of the plurality of objects, the icons to indicate whether the respective object is assigned the first action.

7. The device of claim 6, wherein a first icon of the icons indicates that an adjacent object is assigned to the second action and wherein a second icon of the icons indicates that an adjacent object is assigned to the first action.

8. The device of claim 7, wherein, upon receiving an assignment of the first action to a selected object, the first icon transforms into the second icon using an animation.

9. The device of claim 1, wherein the mass decision option indicates a number of objects of the plurality of objects assigned to the second action.

10. The device of claim 1, wherein the mass decision option indicates a number of objects of the plurality of objects assigned to the first action.

11. The device of claim 1, wherein the device is a handheld mobile device having a touch sensitive display screen.

12. A method comprising:
    receiving a plurality of objects with an initial status to be presented to a user via a mass decision mode graphical user interface (GUI) of a client application residing on a client device; and
    generating the mass decision mode GUI, the mass decision mode GUI including a description of the respective objects of the plurality of objects and a mass decision option, the mass decision option to execute a first action on a first portion of the plurality of objects and to execute a second action on a remainder portion of the plurality of objects upon being selected, the first action being distinct from the second action, execution of the second action and the first action causing a change in a status of the plurality of objects, the first action and the second action selected from the group consisting of approve a portion of the objects, accept the portion of the objects, confirm the portion of the objects, mark the portion of the objects as read, address message to the portion of the objects, carbon copy or blind copy the portion of the objects, and purchase the portion of the objects;
    assigning, upon receiving a selection of an object of the plurality of objects, the first action to the object, the object comprising the first portion of the plurality of objects; and
    in response to receiving a selection of the mass decision option, performing the first action on the first portion of the plurality of objects and the second action on the remainder portion of the plurality of objects.

13. The method of claim 12, further comprising generating a deviant decision GUI upon receiving a selection of an object of the plurality of objects, the deviant decision GUI including a further description of the selected object and an option to assign the first action to the selected object.

14. The method of claim 13, wherein the deviant decision GUI includes an option to return to the mass decision mode GUI without assigning the first action to the selected object.

15. The method of claim 13, wherein the deviant decision interface includes an option to assign the second action to the selected object.

16. The method of claim 12, wherein the mass decision mode GUI further comprises icons adjacent to the respective objects of the plurality of objects, the icons to indicate whether the respective object is assigned the first action.

17. The method of claim 16, wherein a first icon of the icons indicates that an adjacent object is assigned to the second action and wherein a second icon of the icons indicates that an adjacent object is assigned to the first action.

18. The method of claim 17, wherein, upon receiving an assignment of the first action to a selected object, the first icon transforms into the second icon using an animation.

19. A non-transitory machine-readable storage medium having instructions embodied thereon, the instructions executable by one or more machine to perform operations comprising:
    receiving a plurality of objects with an initial status to be presented to a user via a mass decision mode graphical user interface (GUI) of a client application residing on a client device;
    generating the mass decision mode GUI, the mass decision mode GUI including a description of the respective objects of the plurality of objects and a mass decision option, the mass decision option configured to execute a first action on a first portion of the plurality of objects and to execute a second action on a remainder portion of the plurality of objects upon being selected, the first action distinct from the second action, execution of the second action and the first action causing a change in a status of the plurality of objects, the first action and the second action selected from the group consisting of approve a portion of the objects, accept the portion of the objects, confirm the portion of the objects, mark the portion of the objects as read, address message to the portion of the objects, carbon copy or blind copy the portion of the objects, and purchase the portion of the objects;
    assigning, upon receiving a selection of an object of the plurality of objects, the first action to the object, the object comprising the first portion of the plurality of objects; and
    in response to receiving a selection of the mass decision option, performing the first action on the first portion of the plurality of objects and the second action on the remainder portion of the plurality of objects.

* * * * *